(12) United States Patent
Yao

(10) Patent No.: US 8,797,713 B2
(45) Date of Patent: Aug. 5, 2014

(54) LAMINATED CERAMIC CAPACITOR

(71) Applicant: Murata Manufacturing Co., Ltd., Nagaokakyo (JP)

(72) Inventor: Takayuki Yao, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 14/065,156

(22) Filed: Oct. 28, 2013

(65) Prior Publication Data

US 2014/0049876 A1    Feb. 20, 2014

Related U.S. Application Data

(63) Continuation of application No. PCT/JP2012/069426, filed on Jul. 31, 2012.

(30) Foreign Application Priority Data

Aug. 2, 2011    (JP) .................... 2011-169324

(51) Int. Cl.
*H01G 4/06*    (2006.01)
*H01G 4/12*    (2006.01)
*H01G 4/30*    (2006.01)

(52) U.S. Cl.
CPC ........... *H01G 4/1227* (2013.01); *H01G 4/1218* (2013.01); *H01G 4/1245* (2013.01); *H01G 4/30* (2013.01)
USPC .................. 361/321.4; 361/321.1; 361/321.5; 361/311; 361/313; 361/303

(58) Field of Classification Search
CPC . H01G 4/1227; H01G 4/1218; H01G 4/1245; H01G 4/018; H01G 4/30
USPC .......... 361/321.4, 321.1, 321.2, 303–305, 361/306.1–306.3, 311–313, 321.5, 301.4
See application file for complete search history.

(56) References Cited

U.S. PATENT DOCUMENTS 6,233,134 B1 *   5/2001   Sakamoto et al. ............ 361/311
(Continued)

FOREIGN PATENT DOCUMENTS

JP       10-152530         6/1998
JP       2007-291076 A    11/2007
(Continued)

OTHER PUBLICATIONS

PCT/JP2012/076904, International Search Report, date of mailing Jan. 22, 2013.
(Continued)

*Primary Examiner* — Nguyen T Ha
(74) *Attorney, Agent, or Firm* — Dickstein Shapiro LLP

(57) ABSTRACT

Provided is a laminated ceramic capacitor that can suppress the decrease in insulation resistance after a moisture-resistance loading test. It contains ceramic layers which include: main-phase grains that have a perovskite-type compound containing Ba and Ti and optionally containing Ca, Sr, Zr, and Hf; and secondary-phase grains that have an average grain size of 100 nm or more and have a Si content of 50 mol % or more per grain, the average grain boundary number, represented by (Average Thickness for Ceramic Layers 3)/(Average Grain Size for Main Phase Grains)−1, is greater than 0 and 3.0 or less, and the average grain size for the secondary-phase grains is ¼ or more of the average thickness for the ceramic layers 3.

12 Claims, 1 Drawing Sheet

(56) References Cited

U.S. PATENT DOCUMENTS

| | | | |
|---|---|---|---|
| 6,331,932 B1 * | 12/2001 | Kobayashi et al. | 361/321.2 |
| 6,853,536 B2 * | 2/2005 | Nakamura et al. | 361/321.4 |
| 7,397,649 B2 * | 7/2008 | Muto et al. | 361/321.4 |
| 7,595,975 B2 * | 9/2009 | Suzuki et al. | 361/321.4 |
| 7,796,373 B2 * | 9/2010 | Sasabayashi et al. | 361/321.4 |
| 8,488,298 B2 * | 7/2013 | Yao | 361/321.4 |
| 2009/0269528 A1 | 10/2009 | Wada et al. | |

FOREIGN PATENT DOCUMENTS

| | | |
|---|---|---|
| JP | 2009-298139 A | 12/2009 |
| WO | WO-2008/029809 A1 | 3/2008 |

OTHER PUBLICATIONS

PCT/JP2012/069426, Written Opinion of the International Searching Authority, date of mailing Oct. 9, 2012.

* cited by examiner

LAMINATED CERAMIC CAPACITOR

This is a continuation of application Serial Number PCT/JP2012/069426, filed Jul. 31, 2012, the entire contents of which are incorporated herein by reference.

TECHNICAL FIELD

The present invention relates to a laminated ceramic capacitor.

BACKGROUND ART

Laminated ceramic capacitors, as one typical ceramic electronic component, typically have: a laminate including a plurality of stacked ceramic layers and a plurality of internal electrodes formed along the interfaces between the ceramic layers; and a plurality of external electrodes formed on the outer surface of the laminate and electrically connected to the internal electrodes.

With the recent progress of electronics technology, a reduction in size and increase in capacitance have been required for laminated ceramic capacitors. In order to satisfy these requirements, the development of laminated ceramic capacitors including high dielectric constant ceramic layers has been advanced. For example, Patent Document 1 discloses a laminated ceramic capacitor wherein ceramic layers contain a main constituent including barium titanate and an accessory constituent including an oxide of Mg and an oxide of Si, and a segregation phase mainly including Mg and Si is formed in the ceramic layers.

PRIOR ART DOCUMENTS

Patent Documents

Patent Document 1: Japanese Patent Application Laid-Open No. 2006-173352

DISCLOSURE OF THE INVENTION

Problem to be Solved by the Invention

However, the laminated ceramic capacitor described in Patent Document 1 insufficiently suppresses the generation and progression of cracks, and IR degradation in a moisture-resistance loading test. Therefore, the problem of decreased insulation resistance after the moisture-resistance loading test has been resulted.

The present invention has been made in view of the problem mentioned above, and an object thereof is to provide a laminated ceramic capacitor that has a high dielectric constant, and can suppress the decrease in insulation resistance after a moisture-resistance loading test.

Means for Solving the Problem

A laminated ceramic capacitor according to the present invention includes: a laminate including a plurality of ceramic layers stacked and a plurality of internal electrodes formed along the interfaces between the ceramic layers; and a plurality of external electrodes formed on the outer surface of the laminate and electrically connected to the internal electrodes, wherein the ceramic layers include: main-phase grains that have a perovskite-type compound containing Ba and Ti and optionally containing Ca, Sr, Zr, and Hf; and secondary-phase grains that have an average grain size of 100 nm or more and have a Si content of 50 mol % or more per grain, the average grain boundary number, represented by (Average Thickness for Ceramic Layers)/(Average Grain Size for Main Phase Grains)−1, is greater than 0 and 3.0 or less, and the average grain size for the secondary-phase grains is ¼ or more of the average thickness for the ceramic layers.

In the laminated ceramic capacitor according to the present invention, the perovskite-type compound is preferably barium titanate or barium calcium titanate. Advantageous effect of the invention The present invention can provide a laminated ceramic capacitor that has a high dielectric constant, and can suppress the decrease in insulation resistance after a moisture-resistance loading test and make significant contributions to the reduction in size and the increase in performance for the laminated ceramic capacitor.

MODE FOR CARRYING OUT THE INVENTION

Figure 1:
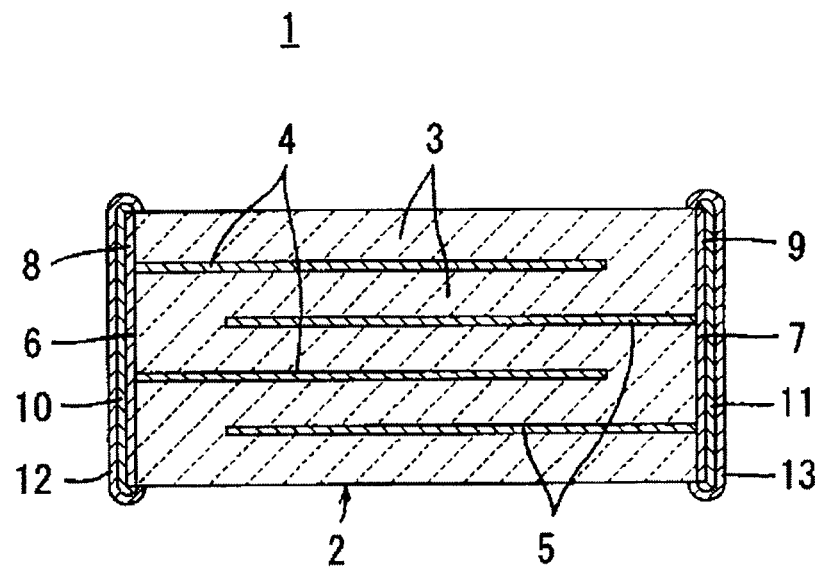
FIG. 1 is a schematic diagram illustrating an example of a laminated ceramic capacitor according to the present invention.

A laminated ceramic capacitor 1 according to the present invention will be first described with reference to FIG. 1.

The ceramic capacitor 1 includes a laminate 2 including a plurality of stacked ceramic layers 3, and a plurality of internal electrodes 4 and 5 formed along the interfaces between the ceramic layers 3.

First and second external electrodes 8 and 9 are formed in positions different from each other on the outer surface of the laminate 2. In the case of the laminated ceramic capacitor 1 illustrated in FIG. 1, the first and second external electrodes 8 and 9 are formed respectively on respective end surfaces 6 and 7 of the laminate 2, which are opposed to each other. The internal electrodes 4 and 5 include a plurality of first internal electrodes 4 electrically connected to the first external electrode 8 and a plurality of second internal electrodes 5 electrically connected to the second external electrode 9, and these first and second internal electrodes 4 and 5 are arranged alternately in the stacking direction. If necessary, first plating layers 10 and 11 and second plating layers 12 and 13 are formed on the surfaces of the external electrodes 8 and 9.

The ceramic layers 3 include: main-phase grains that have a perovskite-type compound containing Ba and Ti and optionally containing Ca, Sr, Zr, and Hf; and secondary-phase grains that have an average grain size of 100 nm or more and have a Si content of 50 mol % or more per grain. The perovskite-type compound is preferably barium titanate or barium calcium titanate. In this case, the advantageous effect of the present invention is pronounced.

In addition, the secondary-phase grains have an average grain size of 100 nm or more and have a Si content of 50 mol % or more per grain.

In the present invention, the average grain boundary number, represented by (Average Thickness for Ceramic Layers)/(Average Grain Size for Main Phase Grains)−1, is greater than 0 and 3.0 or less, and the average grain size for the secondary-phase grains is ¼ or more of the average thickness for the ceramic layers. In this case, it is possible to suppress the decrease in insulation resistance after a moisture-resistance loading test.

The mechanism that suppresses the decrease in insulation resistance after a moisture-resistance loading test by controlling the average grain boundary number and the average grain size for the secondary-phase grains is not clear, but is inferred as follows. First, it is inferred that the possibility that the grain boundaries of the ceramic layers are eroded by moisture during the moisture-resistance loading test will be decreased when the average grain boundary number is greater than 0 and 3.0 or less. In addition, it is inferred that when the average grain size for the secondary-phase grains is ¼ or more of the average thickness for the ceramic layers, the possibility that the progression of cracking is stopped in the secondary-phase grain section will be increased even when there is cracking during in the moisture-resistance loading test.

It is to be noted that the ceramic layers 3 may contain therein at least one element of La, Ce, Pr, Nd, Sm, Eu, Gd, Tb, Dy, Ho, Er, Tm, Lu, and Y, without interfering with the object of the present invention. In addition, the ceramic layers 3 may contain therein at least one element of Mn, Ni, Fe, Cu, Mg, V, and Al.

Next, an example of a method for manufacturing the laminated ceramic capacitor according to the present invention will be described.

First, oxide or carbonate powders of Ba, Ca, Sr, Ti, Zr, and Hf are prepared as starting raw materials for a main constituent. These powders of the starting raw materials are weighed, and subjected to mixing and grinding in a liquid with the use of media. After drying, the mixed powder obtained is subjected to a heat treatment to obtain a ceramic raw material powder. While this method is generally referred to as a solid-phase synthesis method, wet synthesis methods such as a hydrothermal synthesis method, a hydrolysis method, and an oxalic acid method, may be used as other methods.

Next, this ceramic raw material powder is mixed with an organic binder in a solvent, if necessary, to prepare a ceramic slurry. This ceramic slurry is subjected to sheet forming to obtain ceramic green sheets.

Next, conductive films to serve as internal electrodes are formed on the ceramic green sheets. There are several methods for this formation, and a one simple method is where a paste including metal particles and an organic vehicle is applied by screen printing into a desired pattern. In addition, there are also methods in which metal foil is transferred, and methods in which a conductive film is formed with masking by a vacuum thin film formation method.

Next, a large number of layers of the ceramic green sheets and internal electrodes are stacked, and subjected to pressure bonding to obtain an unfired raw laminate.

Next, the raw laminate is subjected to firing at a predetermined temperature in a predetermined atmosphere in a firing furnace to obtain a laminate.

Next, external electrodes are formed on sections of the laminate where the internal electrodes are drawn (exposed). Methods for forming the external electrodes include a method of applying and baking a paste including glass frit and metal particles such as Cu and Ag. Furthermore, plating layers such as Ni and Sn are formed on the surfaces of the external electrodes, if necessary. The laminated ceramic capacitor is manufactured in the way described above.

Experimental Example 1

In Experimental Example 1, a laminated ceramic capacitor including barium titanate for main-phase grains of ceramic layers was prepared to confirm the advantageous effect of the invention.

First, respective powders of $BaCO_3$ and $TiO_2$ were prepared as starting raw materials, and weighed so that the Ba content was 100.8 parts by mol with respect to 100 parts by mol of Ti. Thereafter, the weighed materials were subjected to mixing and grinding in a liquid with the use of media. After drying, the mixed powder obtained was subjected to a heat treatment to obtain a barium titanate powder.

In this case, the degree of synthesis for the barium titanate powder was varied by controlling the grain sizes of the respective powders of $BaCO_3$ and $TiO_2$ as starting raw materials. More specifically, reduced grain sizes of the respective powders of $BaCO_3$ and $TiO_2$ increased the degree of synthesis for barium titanate to suppress the grain growth of the fired main-phase grains. On the other hand, the increased grain sizes of the powders of $BaCO_3$ and $TiO_2$ decreased the degree of synthesis for barium titanate to promote the grain growth of the fired main-phase grains. The degree of synthesis for the barium titanate powder was evaluated with a c/a axis ratio which itself was measured by using an XRD diffraction method.

Next, respective powders of $Dy_2O_3$, $MgCO_3$, $MnCO_3$, and $SiO_2$ were prepared, and weighed so that the Dy content, Mg content, Mn content, and Si content were respectively 1.0 part by mol, 1.0 part by mol, 0.5 parts by mol, and 2.0 parts by mol with respect to 100 parts by mol of Ti in the barium titanate powder. Then, the powders were mixed with the barium titanate powder, and subjected to mixing and grinding in a liquid with the use of media. Thereafter, the obtained slurry was subjected to evaporative drying to obtain a ceramic raw material powder.

A ceramic raw material powder obtained with the addition of a polyvinyl butyral based binder and an organic solvent such as ethanol was subjected to wet mixing for 24 hours in a ball mill to prepare a ceramic slurry. This ceramic slurry was subjected to sheet forming by a lip coater to obtain ceramic green sheets.

Next, a paste containing Ni as its main constituent was applied by screen printing onto the ceramic green sheets, thereby forming conductive films to serve as internal electrodes.

The multiple ceramic green sheets with the conductive films formed thereon were stacked in such a way that the sides to which the conductive films were drawn (extended) were alternated, thereby providing a raw laminate.

The raw laminate was heated to 300° C. in a nitrogen atmosphere to burn off the binder. Thereafter, a laminate was obtained by keeping at 800° C. for 3 hours, and then firing at a temperature of 1200° C. for 2 hours in a reducing atmosphere including a $H_2$—$N_2$—$H_2O$ gas with an oxygen partial pressure of $10^{-10}$ MPa.

In this case, the oxygen partial pressure at 1200° C. was controlled to vary the grain sizes of secondary-phase grains. That is, the grain sizes of the secondary-phase grains were increased as the oxygen partial pressure was increased. On the other hand, the grain sizes of the secondary-phase grains were reduced as the oxygen partial pressure was reduced.

Next, a copper paste containing a $B_2O_3$—$Li_2O$—$SiO_2$—BaO glass frit was applied onto both end surfaces of the laminate, to which the internal electrodes had been drawn. Then, baking was carried out at 800° C. in a nitrogen atmosphere to form external electrodes electrically connected to the internal electrodes.

The external dimensions of the laminated ceramic capacitor prepared as described above were 1 mm in length, 0.5 mm in width, and 0.5 mm in thickness, and the number of effective ceramic layers was 100. In addition, the area of the electrode opposed per layer was 0.3 mm². The average thickness for the ceramic layers interposed between the internal electrodes is as shown in Table 1.

Measurement of Average Thickness for Ceramic Layers

First, each sample was placed perpendicularly, and surrounded and fixed with a resin. In this case, the resin was used so as to expose the LT side surface (length-height side surface: side surface from which the internal electrodes including sections connecting to the external electrode are exposed when polishing is carried out) of each sample. The LT cross section was exposed by polishing the LT side surface with a polishing machine, and completing the polishing at ½ of the depth in the W direction (width direction) of the laminate. This polished surface was subjected to ion milling to remove sludge produced by the polishing. In this way, the cross sections for observation were obtained.

Figure 2:
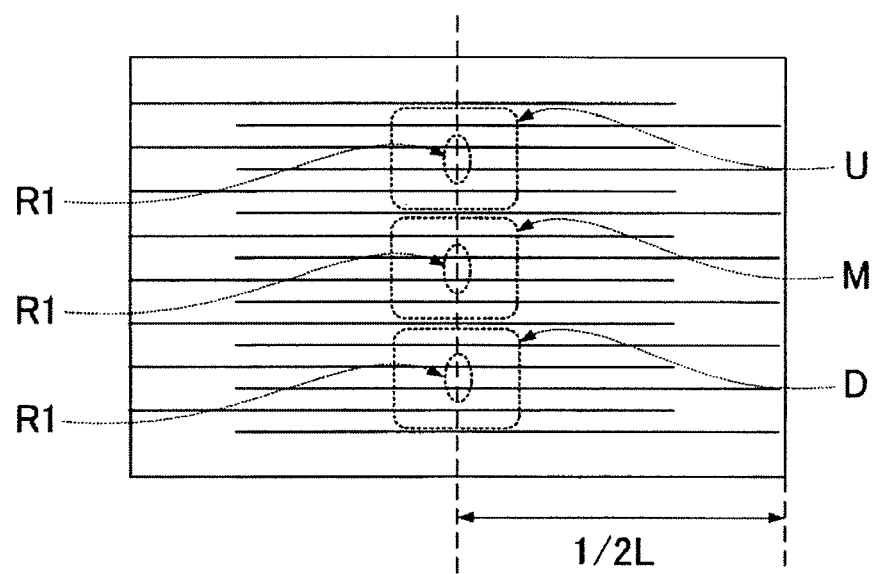
FIG. 2 is an explanatory diagram illustrating a method for measuring an average thickness for ceramic layers.

As illustrated in FIG. 2, a line perpendicular to the internal electrodes was drawn at ½ in the L direction (length direction) of the LT cross section. Next, a region of the sample with the stacked internal electrodes was divided equally in the T direction (height direction) into three regions of: upper section U; middle section M; and lower section D. Then, twenty internal electrodes were selected from a central section in the height direction of each region (a region including the twenty internal electrodes is shown as a measurement region R1 in the drawing), and the thickness for these internal electrodes was measured on the perpendicular line. However, excluded were the outermost internal electrodes, and internal electrodes which were unmeasurable due to the fact such as that the defective internal electrode on the perpendicular line made a connection between the ceramic layers sandwiching the internal electrode.

For each sample, the thickness for the internal electrodes was measured at sixty points. This measurement at sixty points was made with n=3 for each condition (sample number) to obtain the average value of the measurements. (60 points×3=180 points)

Average Grain Size for Main Phase Grains

The ceramic layer section of the laminated ceramic capacitor was made into a thin section of 40 nm or less in thickness with the use of an ion milling method to obtain a cross section for observation.

Then, a transmission electron microscope (TEM) was used to extract multiple grains which did not overlap with each other in a direction perpendicular to the cross section, in the cross section for observation near the centers of grains in each sample. That is, the observation by the TEM was in the cross section near the centers of grains in each sample, and further, the electron diffraction pattern from the TEM were used to confirm whether or not multiple grains overlapped with each other in the perpendicular direction, and to extract grains that were not overlapped with each other.

Subsequently, the extracted grains were subjected to a mapping analysis for each grain under TEM observation with the use of an energy dispersive X-ray analyzer (EDX). Then, from the species of the elements constituting each grain, the respective grains were classified into the group of main-phase grains and the group of grains other than the main-phase grains.

Next, fifty grains were extracted at random from the main-phase grains, TEM images were subjected to an image analysis, and the area of the portion inside the grain boundary for each grain was used to calculate the equivalent circle diameter.

This calculation was made for five visual fields, and the average grain size for the main-phase grains was calculated from the average value of the equivalent circle diameters in the five visual fields (50 grains×5 visual fields=250 pieces of data).

Average Grain Size for Secondary Phase Grains

The grains classified into the group of grains other than the main-phase grains in accordance with the procedure described previously were subjected to a mapping analysis at a low magnification with the use of TEM-EDX to specify grains with a Si content ratio of 50 mol % or more (provided that oxygen was excluded from the calculation of the ratio).

Furthermore, the TEM images of the specified grains were subjected to an image analysis, and the area of the portion inside the grain boundary for each grain was used to calculate the equivalent circle diameter. Grains of 100 nm or more in equivalent circle diameter were regarded as secondary-phase grains. Ten secondary-phase grains were extracted at random for each of five visual fields, and the average value of the equivalent circle diameters for the secondary-phase grains in the five visual fields was regarded as the average grain size for the secondary-phase grains (10 grains×5 visual fields=50 pieces of data).

A moisture-resistance loading test was carried out in such a way that 4 V was applied to the laminated ceramic capacitor under the condition of 85° C./85% RH. The number of samples (n) was 50. Thereafter, the insulation resistance was measured for the samples to count the number of samples with degraded insulation resistance.

Table 1 shows the experimental conditions and number of samples with degraded insulation resistance after the moisture-resistance loading test for sample numbers 1 to 10. It is to be noted that the sample numbers marked with in the table indicate that the samples fall outside the scope of the present invention.

TABLE 1

| SAMPLE NUMBER | CERAMIC LAYER THICKNESS t (μm) | c/a AXIS RATIO | OXYGEN PARTIAL PRESSURE $P_{O2}$ (×$10^{-9}$ MPa) | AVERAGE GRAIN SIZE A FOR MAIN PHASE GRAIN (nm) | AVERAGE GRAIN BOUNDARY NUMBER t/A − 1 | AVERAGE GRAIN SIZE B FOR SECONDARY PHASE GRAIN (nm) | B/t | THE NUMBER OF SAMPLES WITH INSULATION RESISTANCE DEGRADED AFTER MOISTURE RESISTANCE LOADING TEST |
|---|---|---|---|---|---|---|---|---|
| 1 | 1.2 | 1.0075 | 3.07 | 320 | 2.8 | 310 | 0.26 | 0/50 |
| 2 | 0.5 | 1.0080 | 1.97 | 280 | 0.8 | 150 | 0.30 | 0/50 |
| 3 | 0.7 | 1.0085 | 2.79 | 200 | 2.5 | 200 | 0.29 | 0/50 |
| 4 | 0.8 | 1.0085 | 2.91 | 200 | 3.0 | 230 | 0.29 | 0/50 |
| 5* | 1.2 | 1.0086 | 2.99 | 190 | 5.3 | 300 | 0.25 | 2/50 |
| 6* | 0.6 | 1.0094 | 2.80 | 140 | 3.3 | 200 | 0.33 | 3/50 |
| 7* | 1.1 | 1.0076 | 1.45 | 310 | 2.5 | 100 | 0.09 | 5/50 |
| 8* | 0.9 | 1.0083 | 1.75 | 250 | 2.6 | 120 | 0.13 | 4/50 |
| 9* | 1.0 | 1.0085 | 1.51 | 210 | 3.8 | 100 | 0.10 | 8/50 |
| 10* | 0.9 | 1.0086 | 1.37 | 190 | 3.7 | 80 | 0.09 | 10/50 |

As is clear from Table 1, sample numbers 1 to 4 in which the average grain boundary number is greater than 0 and 3.0 or less, and in which the average grain size for the secondary-phase grains is ¼ or more of the average thickness for the ceramic layers have achieved favorable results without producing any samples with degraded insulation resistance after the moisture-resistance loading test.

Experimental Example 2

In Experimental Example 2, a laminated ceramic capacitor including barium calcium titanate for main-phase grains of ceramic layers was prepared to confirm the advantageous effect of the invention.

Respective powders of $BaCO_3$, $CaCO_3$, and $TiO_2$ were prepared as starting raw materials, and then weighed so that the total content of Ba and Ca was 100.5 parts by mol with respect to 100 parts by mol of Ti, and that the molar ratio of Ba/(Ba+Ca) was 0.9, thereby preparing a barium calcium titanate powder. Further, respective powders of $Y_2O_3$, $MgCO_3$, $V_2O_5$, and $SiO_2$ were prepared, and weighed so that the Y content, Mg content, V content, and Si content were respectively 1.0 part by mol, 1.0 part by mol, 0.2 parts by mol, and 2.0 parts by mol with respect to 100 parts by mol of Ti in the barium calcium titanate powder, and mixed with the barium calcium titanate powder. In the same manner as in Experimental Example 1 except for using the barium calcium titanate powder, a ceramic raw material powder was obtained.

Then, the ceramic raw material powder was used to prepare laminated ceramic capacitors in the same manner as in Experimental Example 1. Table 2 shows the results.

TABLE 2

| SAMPLE NUMBER | CERAMIC LAYER THICKNESS t (μm) | c/a AXIS RATIO | OXYGEN PARTIAL PRESSURE $P_{O2}$ (×10⁻⁹ MPa) | AVERAGE GRAIN SIZE A FOR MAIN PHASE GRAIN (nm) | AVERAGE GRAIN BOUNDARY NUMBER t/A − 1 | AVERAGE GRAIN SIZE B FOR SECONDARY PHASE GRAIN (nm) | B/t | THE NUMBER OF SAMPLES WITH INSULATION RESISTANCE DEGRADED AFTER MOISTURE RESISTANCE LOADING TEST |
|---|---|---|---|---|---|---|---|---|
| 11 | 0.9 | 1.0085 | 2.85 | 280 | 2.2 | 280 | 0.31 | 0/50 |
| 12 | 0.6 | 1.0092 | 1.97 | 150 | 3.0 | 150 | 0.25 | 0/50 |
| 13 | 1.1 | 1.0075 | 3.00 | 320 | 2.4 | 300 | 0.27 | 0/50 |
| 14 | 0.5 | 1.0090 | 1.85 | 170 | 1.9 | 160 | 0.32 | 0/50 |
| 15* | 0.7 | 1.0092 | 3.05 | 140 | 4.0 | 300 | 0.43 | 1/50 |
| 16* | 0.8 | 1.0089 | 2.90 | 180 | 3.4 | 240 | 0.30 | 4/50 |
| 17* | 0.9 | 1.0076 | 1.51 | 310 | 1.9 | 100 | 0.11 | 2/50 |
| 18* | 1.1 | 1.0077 | 1.64 | 300 | 2.7 | 120 | 0.11 | 4/50 |
| 19* | 1.3 | 1.0088 | 1.70 | 190 | 5.8 | 120 | 0.09 | 6/50 |
| 20* | 0.7 | 1.0095 | 1.34 | 120 | 4.8 | 70 | 0.10 | 12/50 |

As is clear from Table 2, sample numbers 11 to 14 in which the average grain boundary number is greater than 0 and 3.0 or less, and in which the average grain size for the secondary-phase grains is ¼ or more of the average thickness for the ceramic layers have achieved favorable results without producing any samples with insulation resistance degraded after the moisture-resistance loading test.

DESCRIPTION OF REFERENCE SYMBOLS

| 1 | laminated ceramic capacitor |
| 2 | laminate |
| 3 | ceramic layer |
| 4, 5 | internal electrode |
| 6, 7 | end surface |
| 8, 9 | external electrode |
| 10, 11 | first plating layer |
| 12, 13 | second plating layer |

The invention claimed is:

1. A laminated ceramic capacitor comprising: a laminate comprising a plurality of stacked ceramic layers and a plurality of internal electrodes disposed at interfaces between the ceramic layers; and a plurality of external electrodes on an outer surface of the laminate and electrically connected to the internal electrodes,
wherein the ceramic layers comprise:
main-phase grains having a perovskite-type compound containing Ba and Ti and optionally containing one or more of Ca, Sr, Zr, and Hf; and
secondary-phase grains having an average grain size of 100 nm or more and having a Si content (calculated after excluding oxygen) of 50 mol % or more per grain,
the average grain boundary number, (Average Thickness for Ceramic Layers)/(Average Grain Size for Main Phase Grains)−1, is greater than 0 and 3.0 or less, and
the average grain size of the secondary-phase grains is ¼ or more of the average thickness for the ceramic layers.

2. The laminated ceramic capacitor according to claim 1, wherein the perovskite-type compound is barium titanate.

3. The laminated ceramic capacitor according to claim 2, wherein the secondary-phase grains having an average grain size of 200 to 320 nm, the average grain boundary number is at least 0.8, and the average grain size of the secondary-phase grains is up to 30% of the average thickness for the ceramic layers.

4. The laminated ceramic capacitor according to claim 3, wherein the ceramic layers comprise at least one element selected from the group consisting of La, Ce, Pr, Nd, Sm, Eu, Gd, Tb, Dy, Ho, Er, Tm, Lu, and Y.

5. The laminated ceramic capacitor according to claim 2, wherein the ceramic layers comprise at least one element selected from the group consisting of La, Ce, Pr, Nd, Sm, Eu, Gd, Tb, Dy, Ho, Er, Tm, Lu, and Y.

6. The laminated ceramic capacitor according to claim 1, wherein the perovskite-type compound is barium calcium titanate.

7. The laminated ceramic capacitor according to claim 6, wherein the secondary-phase grains having an average grain size of 150 to 320 nm, the average grain boundary number is at least 1.9, and the average grain size of the secondary-phase grains is up to 32% of the average thickness for the ceramic layers.

8. The laminated ceramic capacitor according to claim 7, wherein the ceramic layers comprise at least one element selected from the group consisting of La, Ce, Pr, Nd, Sm, Eu, Gd, Tb, Dy, Ho, Er, Tm, Lu, and Y.

9. The laminated ceramic capacitor according to claim 6, wherein the ceramic layers comprise at least one element selected from the group consisting of La, Ce, Pr, Nd, Sm, Eu, Gd, Tb, Dy, Ho, Er, Tm, Lu, and Y.

10. The laminated ceramic capacitor according to claim 1, wherein the secondary-phase grains having an average grain size of 150 to 320 nm, the average grain boundary number is at least 0.8, and the average grain size of the secondary-phase grains is up to 32% of the average thickness for the ceramic layers.

11. The laminated ceramic capacitor according to claim 10, wherein the ceramic layers comprise at least one element selected from the group consisting of La, Ce, Pr, Nd, Sm, Eu, Gd, Tb, Dy, Ho, Er, Tm, Lu, and Y.

12. The laminated ceramic capacitor according to claim 1, wherein the ceramic layers comprise at least one element selected from the group consisting of La, Ce, Pr, Nd, Sm, Eu, Gd, Tb, Dy, Ho, Er, Tm, Lu, and Y.

* * * * *